(12) United States Patent
Bolduc et al.

(10) Patent No.: US 6,404,877 B1
(45) Date of Patent: *Jun. 11, 2002

(54) AUTOMATED TOLL-FREE TELECOMMUNICATIONS INFORMATION SERVICE AND APPARATUS

(75) Inventors: Raymond L. Bolduc, Morganville; Steven Charles Salimando, Little Silver, both of NJ (US)

(73) Assignee: AT&T Corp., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,624

(22) Filed: Jun. 2, 1998

(51) Int. Cl.[7] ................................................ H04M 3/42
(52) U.S. Cl. .............................. 379/218.01; 379/88.16; 379/115.02
(58) Field of Search ........................... 379/88.13, 88.16, 379/88.17, 88.22, 88.23, 88.24, 88.25, 88.26, 88.27, 88.28, 93.12, 230, 231, 269; 370/350, 351, 352, 354, 356

(56) References Cited

U.S. PATENT DOCUMENTS

| | | | | |
|---|---|---|---|---|
| 4,827,500 A | * | 5/1989 | Binkerd et al. | 379/88.01 |
| 5,187,735 A | * | 2/1993 | Garcia et al. | 379/88.17 |
| 5,204,894 A | * | 4/1993 | Darden | 379/88.03 |
| 5,488,652 A | * | 1/1996 | Bielby et al. | 379/88.03 |
| 5,703,935 A | * | 12/1997 | Raissyan et al. | 379/88.18 |
| 5,884,262 A | * | 3/1999 | Wise et al. | 704/270.1 |
| 5,915,001 A | * | 6/1999 | Uppaluru | 379/88.22 |
| 5,943,410 A | * | 8/1999 | Shaffer et al. | 379/213 |
| 6,052,439 A | * | 4/2000 | Gerzberg et al. | 379/88.01 |
| 6,154,527 A | * | 11/2000 | Porter et al. | 379/88.18 |
| 6,173,279 B1 | * | 1/2001 | Levin et al. | 707/5 |

* cited by examiner

*Primary Examiner*—Fan Tsang
*Assistant Examiner*—Roland G. Foster
(74) *Attorney, Agent, or Firm*—Banner & Witcoff, Ltd.

(57) ABSTRACT

An automated toll-free telecommunications information service may be provided responsive to a user sending an E-mail request via the Internet or by a caller dialing a toll-free telephone number and announcing a voice request wherein the caller request comprises categories of interests. A service node interprets the request and collects matches to the request from a database. A match to a request may comprise the identity of an entity corresponding to the match, a toll-free number for the match and a brief information sketch describing the entity. The matches are announced and played for the caller. The caller may barge in with a predetermined voice announcement such as "please dial" when they wish to select an item of the list. In response, the service node initiates the launch of a call to the selected entity.

16 Claims, 3 Drawing Sheets

AUTOMATED TOLL-FREE TELECOMMUNICATIONS INFORMATION SERVICE AND APPARATUS

I. BACKGROUND OF THE INVENTION

1. Technical Field

Figure 1:
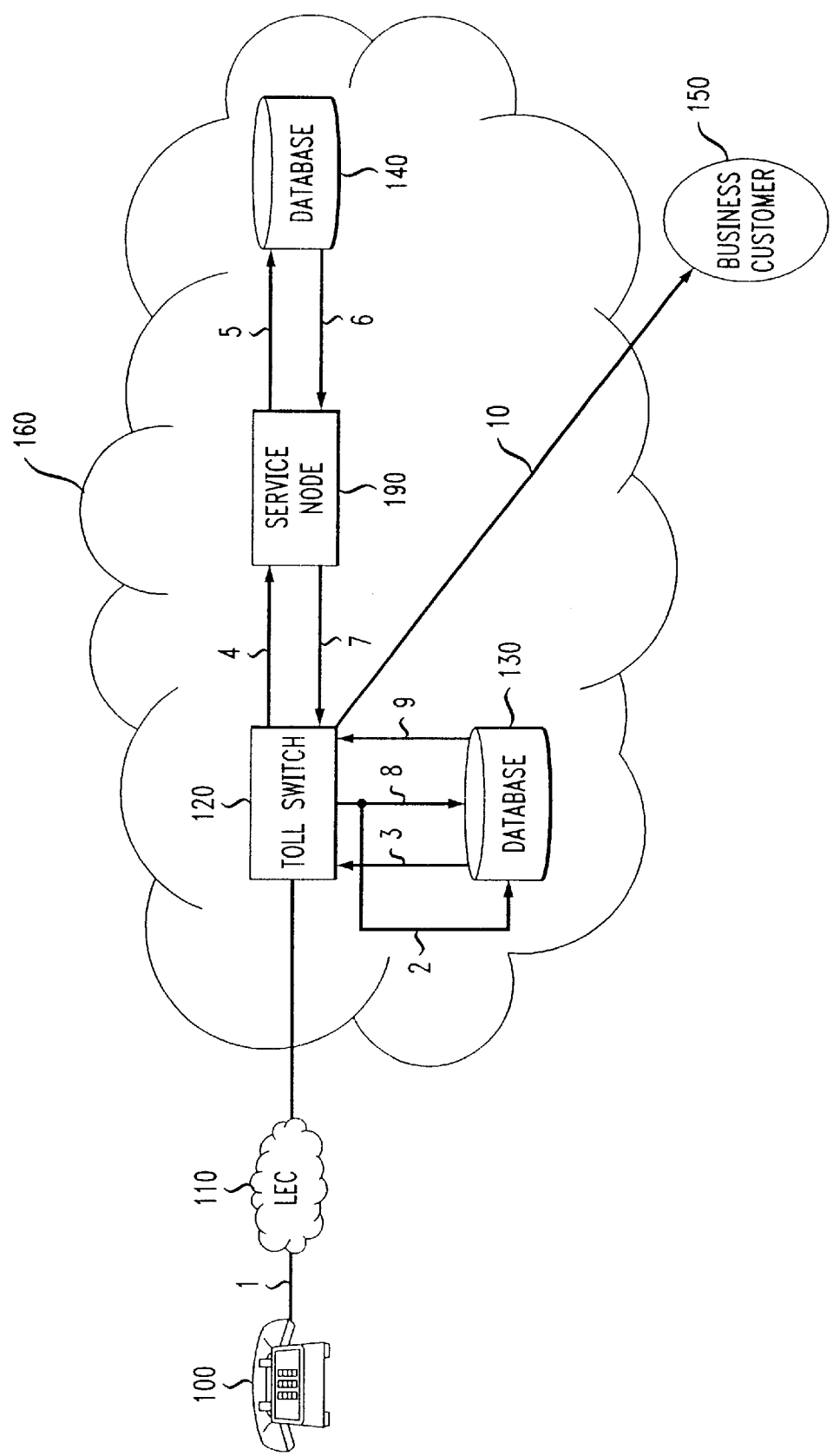

The present invention relates to the field of information services and, more particularly, to automated toll-free information services and apparatus used for performing such services where, for example, in the United States, there exist certain toll-free "area codes" or prefixes for identifying a toll-free call such as 1-800 and 1-888 and wherein such automated toll-free information services may comprise an Internet link to an information services database.

2. Description of the Related Arts

Information services are well known. A caller, desirous of receiving a telephone number for a listing, typically dials an abbreviated telephone number such as 411 or, for long distance, an area code followed by a standard 555-1212 telephone number in the United States for receiving directory assistance. For 1-800 and 1-888 listings of toll-free numbers, consumers can obtain directory assistance in such a simplified manner but are limited to one toll-free number per call. (Recently in the United States, AT&T announced the introduction of an additional 1-877 toll-free service.) The user of toll-free information services calls 1-800-555-1212 and is greeted by AT&T operator services and may receive, for example, a 1-800 toll-free number for a hotel chain reservation number. Many toll-free numbers, typically for businesses, may be found in the Yellow Pages (R) information section of a telephone directory and also are listed in a special toll-free telephone directory which may be obtained for a fee.

Information services are now automated to a great extent. When a caller dials directory assistance, the caller is typically greeted by a voice response unit which requests "For what city please" and a name of a desired listing from the caller. In many instances, the caller may receive a synthesized voice response providing the directory listing. In other instances, the caller may be referred to a live operator at an information service position who may manually assist the caller to receive the synthesized voice response.

Despite the progress toward further automation of directory assistance and information services, there continues a further need to make the process as thoroughly automated as possible and, moreover, provide specialized nationwide assistance to callers requesting toll-free telephone number and other information assistance.

In U.S. patent application Ser. No.08/635,801, filed Apr. 22, 1996, entitled "Method and Apparatus for Information Retrieval Using Audio Interface" of Benedikt et al., there is generally described a network-based information retrieval service for retrieving text-to-voice (TCP/IP to conventional telecommunications) conversion via an interpreter. The interpreter interprets a document into audio data which is provided to an audio user interface. Such an audio browsing adjunct forms an apparatus basis for the present service and apparatus and its disclosure is incorporated by reference herein as to its entire contents.

Also, in U.S. application Ser. No. 08/991,437, filed Dec. 16, 1997, entitled "Method and Apparatus for Providing Telephone Network Based Conversant Services" of Aris A. Yiannoulos, there is described an enhancement of the Benedikt et al system for providing network-based voice interactive services. The user of that invention does not need to provide voice interactive systems on their premises. The user, typically a business customer, may share a network-based voice interactive system with other users. For example, a business may have a toll-free number for allowing employees to retrieve employee savings plan information. The network-based information system provides such information to the employee who calls requesting such information in the same manner as if the voice interactive system were on the employer's premises.

Yet there remains a need in the art for a specialized, automated toll-free information service and apparatus for providing automated information services to callers in need of a toll-free directory listing. Moreover, the system should be flexible enough to permit matching of a plurality of choices of toll-free listings which may be responsive to a general query, for example, for a category of listings.

II. SUMMARY OF THE INVENTION

In the field of toll-free information services and in accordance with the present invention, a network-based server is provided of the type generally described by Benedikt et al. Such a network based service and apparatus may have a unique telecommunications network listing such as 1-800-FIND-4-ME. The user interested in using this service will dial this directory listing and receive toll-free service (there would be no charge for the call). On the other hand, those that subscribe to a toll-free telephone directory may also wish to have their listing made available also over the 1-800-FIND-4-ME service. These customers, typically, business customers, may be provided the service of the present invention for free as a value-added benefit for having subscribed to the toll-free directory or, in the alternative, be asked to pay for such a listing. In either manner, the service may be provided for free to the caller.

According to the present invention, once the caller dials the toll-free 1-800-FIND-4-ME number, the call is routed via a toll switch in a well known manner to a server such as that described by the Benedikt at al. application. An announcement will play such as "Welcome to the toll-free search service. Please give me the category or type of information you request." The caller will be asked to identify a category of interest to the user such as "clothing catalog services" or "bicycling catalogs." In response, a voice interactive system will ask the caller to verify that the listing or information is truly what the caller wishes by repeating the request. In this manner, the caller may verify the request has been accurately interpreted and signify the same by saying "Yes."

Once the request is verified, the voice interactive system initiates a search which may be via the Internet or telecommunications data links to a, preferably, centralized database. The search may return a single response or a plurality of possible responses to the request for a category of listings. If the search of the database is by TCP/IP Internet links, the database may return audio clip packets representing the various matches to the request or the database may return data representing the matches. If the database search is requested by telecommunications data links, the links may be medium speed or baud rate or even lower speed on a bandwidth-on-demand basis, for example, via out-of-band signaling systems such as SS7.

Upon receipt at the server of the data responsive to the query, a response to the user is provided by the network-based voice interactive system such as: "There are five matches to your information request. Would you like to hear about them?" Upon a yes reply by the caller, the voice interactive system may announce: "We will scroll through the entries and play a brief recording introducing the company to you. You may directly connect to the company by pressing the 1 key or skip to the next entry by pressing the pound # key. You may also go back to any point by repeatedly pressing the star * key or by pressing the entry number followed by the pound # key."

According to principles described in copending U.S. application Ser. No. 09/005,256, filed Jan. 9, 1998, for "Method and Apparatus for an Automated Barge-In System" of Steve Salimando, incorporated by reference as to its entire contents, the caller may interrupt at any time during the process and connect to a business listing or even hang up. The user may do so by pressing a key as suggested above, or, in accordance with the '256 application, say the words "Please dial" and be automatically connected to the destination.

A further feature of the present invention is the opportunity to announce the toll-free telephone number to the caller before launching the call to the number and providing the caller with the opportunity to write down or otherwise record it. If the caller does not wish to automatically launch a call to that listing, the caller may simply hang-up. Finally, another feature of the present invention is that the automated toll-free information service may be implemented via a voice call or via the Internet and E-Mail.

These and other features of the present invention will become clear to one of ordinary skill in the art from the following detailed description of the invention and associated drawings.

BRIEF DESCRIPTION OF TILE DRAWINGS

FIG. 1 provides an overall system block diagram for describing the network architecture of the present invention and, in particular, the operation of the service node 190 of the present invention.

Figure 2:
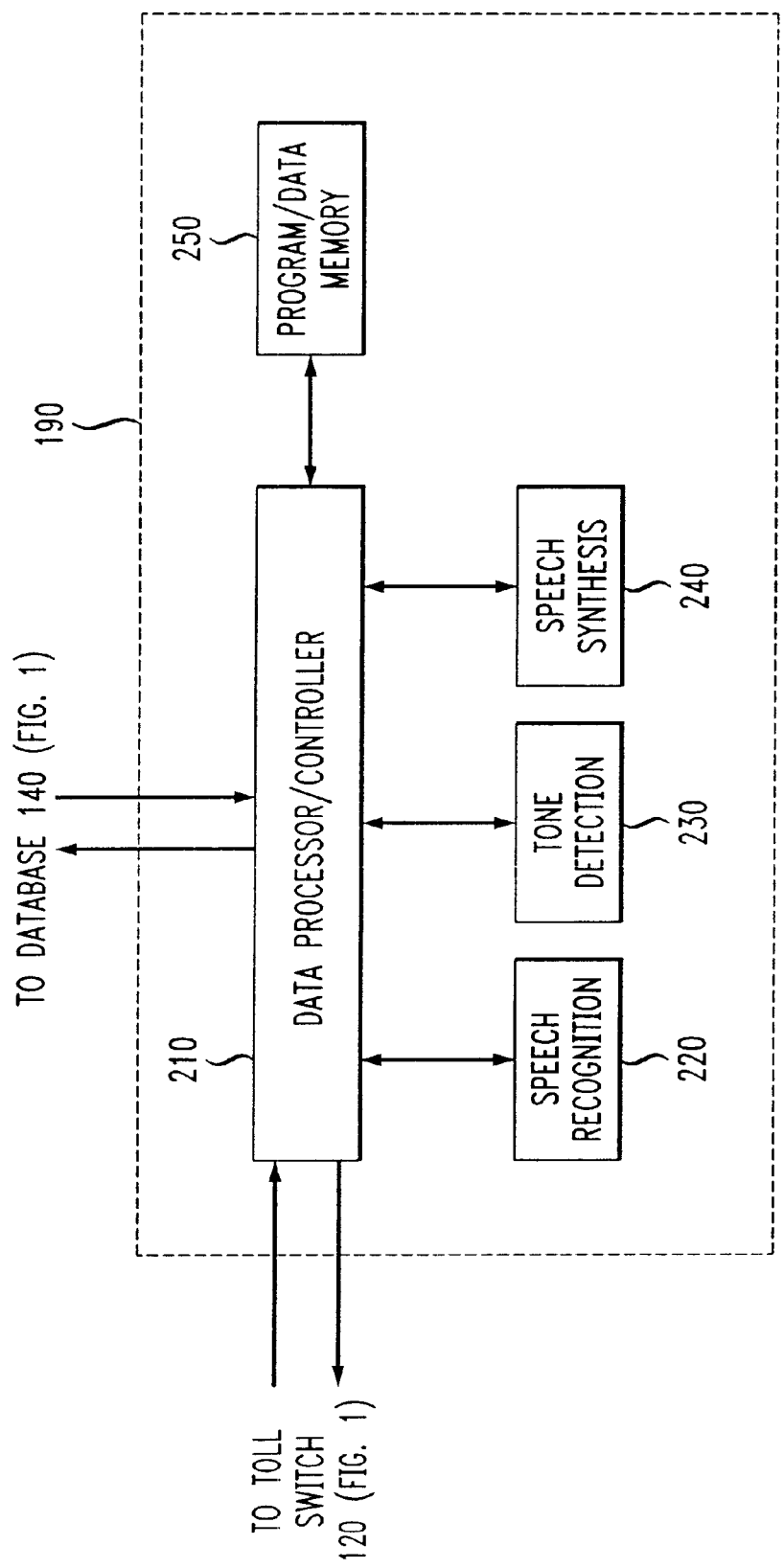

FIG. 2 comprises a functional block schematic diagram of a service node 190 of the present invention for providing automated toll-free telecommunications information services.

Figure 3:
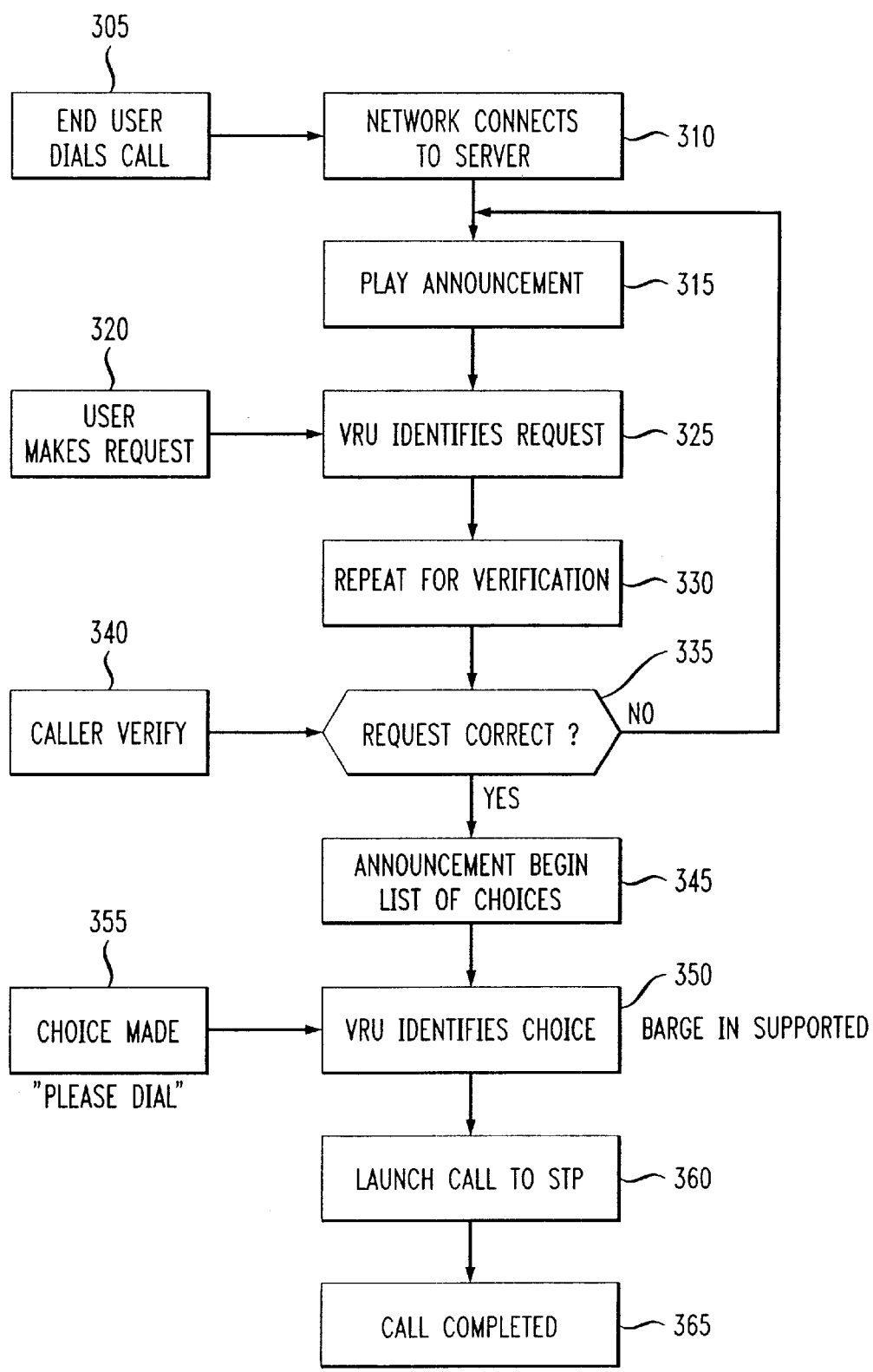

FIG. 3 provides an overall flowchart for describing an algorithm for implementing the present toll-free information service at the service node 190 of FIG. 1.

DETAILED DESCRIPTION

Referring now to FIG. 1, the reference numerals between 1 and 10 relate to steps in a calling process and appear adjacent to network elements performing the steps or to the links connecting network elements. The elements of a telecommunications network including a service node according to the present invention are given reference numerals between 100 and 190. The apparatus for providing an automated toll-free telecommunications information service is most conveniently located in association with service node 190 which may comprise a telecommunications adjunct processor, for example, such as the apparatus described in the application to Benedikt et al. referred to above. In an alternative embodiment, the service node 190 may comprise a portion of or be directly associated with toll switch 120. The surrounding network comprises a caller terminal 100, a local exchange carrier (LEC) 110, the toll switch 120, such as a #4 ESS toll switch, manufactured by Lucent Technologies, Inc., and an associated database 130 for dialed address or number (DN) routing translation. Besides the service node 190, also shown are a typical business customer 150 employing the present service and an information database 140. Network elements 120, 130, 190 and 140 are included within the boundaries of a toll network cloud 160. The business customer 150 may be within the service boundary of the LEC 110 or without its boundary. Similarly, the caller 100 may be in the same LATA as the business customer or outside it. One feature of the present invention as will be described herein is to provide a centralized toll-free information service for any business customer 150 located anywhere in the country so that caller 100 may similarly be located anywhere within the country but learn about the existence of such a business customer and be connected to that business customer through the service node of the present invention.

Referring to FIG. 2, there is shown a functional block schematic diagram of a service node 190 which may perform the automated information service of the present invention. Typically, the service node may comprise a nation-wide resource when performing the present service to which calls may be routed by any toll switch 120 or LEC 110. The service node 190, shown in greater detail in FIG. 2, more particularly comprises speech recognition circuits 220 for recognizing speech of a caller and providing the speech data to a controller/processor 210 for processing. In the alternative, or in addition, the service node 190 comprises tone detection circuitry 230 for recognizing dialed multi-frequency tone signals indicative according to well known telephone dialing keypads of numerals or groups of three alphabetic letters. The service node 190 may comprise a Conversant (™) system available from Lucent Technologies, Inc. or other speech recognition and voice response systems known in the art having call processing capability as well.

Data input to data processor/controller 210 then may come from toll switch 120 (the caller), from information database 140, from speech recognition circuits 220 or from tone detection circuits 230. Programs/algorithms and temporary memory for formulating queries and responses to callers is shown as program/data memory 250. For example, an algorithm for the present invention is shown in flowchart form in FIG. 3. Software representing that or an equivalent flowchart may be resident in memory 250.

Speech synthesis circuitry 240 formulates queries and responses for a caller at terminal 100 responsive to the controller 210 operating the program of the present invention stored in program memory 250. Speech synthesis circuitry 240 may translate TCP/IP audio clip packets to analog voice signals or translate data signals to voice for delivery to caller 100. This is one output function of the service node 190 according to the present invention. One further output function is that controller 210 may process a caller response and undertake the launching of a call to business customer 150. To that end the controller 210 signals the toll switch 120 with the business customer's identification once the caller 100 selects the option of initiating a call to be launched. These and other input and output functions of service node 190 will now be more fully described with reference to FIGS. 1 and 3.

In particular, a typical caller has station apparatus 100 which may comprise a typical telephone station set, a feature set, a vision phone, a personal computer, intelligent web telephone or other apparatus. The caller places a call to a telephone number such as 1-800-FIND-4-ME. This number is exemplary only and may be otherwise suitably chosen for the service. This step is shown as step 1 in FIG. 1. Typically, the caller places the call by going off hook, receiving dial tone from LEC 110 and actuating the corresponding alphanumeric keys of their touch tone keypad. This step corresponds also to box 305 of FIG. 3.

LEC 110 recognizes that the 1-800-FIND-4-ME telephone number is not within its control, is rather within a toll carrier's control such as AT&T and forwards the call and associated dialed number (DN) data to toll switch 120. Toll switch 120 may be referred to as a switch control point (SCP). SCP 120 forwards the dialed number (DN, the dialed 800 number) to database 130 at a network control point for routing translation. This step is shown as step 2 in FIG. 1.

The network control point (NCP) refers to database 130 and obtains routing information for the 1-800-FIND-4-ME number for routing the call to the appropriate service node 190. The routing information includes the platform address of the server of service node 190. This step is shown as step 3 in FIG. 1. Once the toll switch 120, where the call has been temporarily parked, receives the routing information, the toll switch routes the call from caller 100 to service node 190. This step is shown as step 4 in FIG. 1 and box 310 in FIG. 3.

Service node 190 receives the call and a link between the caller 100 and the voice response system of FIG. 2 is now complete. Now the service node plays an announcement at step 315 of FIG. 3. One typical announcement to welcome the caller to the toll-free information service might be: "Welcome to the toll-free search engine. Please give me the category of your interests?" Now the caller 100 may respond in any way the caller wishes. The caller may say "antique auction houses". The caller may say "hotels in Denver, Colorado". This step is shown as box 320 of FIG. 3. Let us assume that the caller requests the category "bicycling catalogs." The speech recognition circuitry 220 of the service node 190 of FIG. 2 collects the response and provides output data to the controller 210. The controller 210 identifies the request as best it can at box 325 of FIG. 3. The controller 210 formulates a verification query from the data it has received. For example, the voice response unit may output data to speech synthesis circuitry 240 to say: "You have asked for bicycling catalogs; if that is the category you are seeking please say—yes—or push one on your keypad now." If the answer is by speech, then speech recognition circuit 220 collects the response; if by tone keypad, then tone detection circuit 230 collects the response. In either event of a yes response, the search engine of the controller 210 will attempt to utilize its own or alternative databases to establish as many matches as possible with the category.

The announcement for verification may continue and say: "If this is not the category you are seeking, please restate your requested category so that we may understand you." This iterative process is shown in FIG. 3 as the loop from "request correct" box 335 to play announcement box 315 and then through boxes 320, 325, 330, 340 and 335 until the request is correctly interpreted.

Continuing with a correct interpretation of the request, controller 210 looks for bicycling catalogs via an Internet or other data link to as many databases as appropriate. Of course, it is most desirable if only one centralized database 140 is needed. Nevertheless, it may be within the boundaries of the present invention to call upon distributed databases 140 via an Internet or telecommunications data query. This step is shown as step 5 on FIG. 1. In accordance with the present invention, the data on a particular match may include the identity of the business customer, the toll-free telephone number and a brief (for example, fifteen-second)) description of the business customer and services. The data may be returned as audio clip data in TCP/IP protocol or other data format. The data then may be translated to a synthesized speech announcement or simply played as received from the database.

The return of matches from database 140 or other databases 140 is shown as step 6 in FIG. 1. Whether one or multiple databases return matches, controller 210 counts the number of matches and announces them to the user. The announcement of the number and identities of choices is shown as step 345 of FIG. 3.

Continuing the example where the caller 100 has requested bicycling catalogs, the announcement may be as follows: "We have found five matches for your category of bicycling catalogs. Would you like to hear about them?" The caller in all likelihood will respond—yes—and the announcement may continue: "We will scroll through all five entries and then play a fifteen-second recording introducing each match. You may connect to our business customer at their toll-free number by pressing the one key or skip to the next entry by pressing the pound key #. You may also go back to any point in the list by pressing the star key * and the entry number followed by the pound key #." Of course, this type of announcement and way of introducing the list of matches is just one way to do so. Other ways may be obvious therefrom such as pressing the star key * multiple times to move backwards or the pound key # multiple times to move forward as many matches as key depressions.

One way a caller 100 may signify which entry may be of interest is via a barge-in. For example, the user may wish to barge in after hearing about a particular entry such as Mountain Bikes of Denver, Colo. Barge-in is further described by U.S. patent Application Ser. No. 09/005,256, filed Jan. 9, 1998, and incorporated herein by reference. The user simply says—yes—to a particular match such as Mountain Bikes and the announcement VRU may continue as follows: "The toll-free number for Mountain Bikes of Denver, Colo. is 1-800-MTBIKES. We will dial it now for you if you say—Please dial." Barge-in and making a choice are shown as steps 350 and 355. Once the command "please dial" is interpreted, the controller may initiate control signals for launching a call to Mountain Bikes at step 360. The new dialed number (DN) for mountain bikes is signaled to toll switch 120, the switch control point (SCP), at step 7 of FIG. 1. A DN to routing translation is done according to a well known manner at steps 8 and 9 by looking up the dialed number in database 130 of a network control point (NCP) and returning the routing information to toll switch 120. Finally at step 10 of FIG. 1, the call is completed to Mountain Bikes, the exemplary business customer 150 whom the caller 100 has selected.

There exist obvious variations on the present invention. In one embodiment, the user may receive all the telephone numbers of all the matches by voice. The caller 100 may request that they be transmitted by E-Mail to their corresponding E-Mail address. The user may request that the bicycling catalog itself be transmitted to their E-Mail address where the user may print the catalog out themselves using their personal computer and printer.

In an alternative embodiment, the caller may make an E-Mail request of the present toll-free information service and receive voice responses. The Internet service provider of such a toll-free information service may collect the automatic number identification (ANI) data corresponding to the telephone number of the caller requesting service and forward that address to the service node. The service node may initiate a call to the caller 100 based on the ANI data and upon having completed an analysis of the E-Mail request for toll-free information and announce to the caller the number of matches and so on following steps 335 to 365 from FIG. 3 as the caller desires.

Other modifications of the present invention may come to mind of one of ordinary skill in the art. All patent applications identified herein should be deemed to be incorporated by reference as to their entire contents. The present invention should only be deemed to be limited in scope by the claims which follow.

What we claim is:

1. A method for providing automated toll-free telecommunications information comprising the steps of:

receiving at a toll switch data representing a dialed number for a toll-free telecommunications information service, translating the dialed number to routing information for a service node for providing the toll-free telecommunications information service, routing the call to the service node for providing the toll-free telecommunications information service, collecting a caller request for toll-free information wherein the caller request for toll-free information comprises a request for toll-free data associated with contacts in categories of interest, collecting a number of data matches to the caller request wherein the data matches comprise the toll-free data, generating an announcement corresponding to data representing the data matches, and receiving a caller selection of at least one of the data matches.

2. A method for providing automated toll-free telecommunications information as recited in claim 1 further comprising the step of launching a call to a business entity corresponding to said user selection.

3. A method for providing automated toll-free telecommunications information as recited in claim 1 wherein said dialed number for said toll-free telecommunication information service is a toll-free number.

4. A method as recited in claim 3 wherein said dialed toll-free number 1-800-FIND-4-ME.

5. A method for providing automated toll-free telecommunications information as recited in claim 1 further comprising the step of verifying the caller request with the caller.

6. A method for providing automated toll-free telecommunications information as recited in claim 5 wherein said step of collecting a caller request for toll-free information and the step of verifying the caller request comprise the steps of announcing the caller request to the caller responsive to receiving the caller request and requesting the caller to verify that the request is correct.

7. A method as recited in claim 6 comprising the step of iterating the process of collecting and verifying the caller request responsive to the caller indicating that the caller request is not correct.

8. A method as recited in claim 1 wherein said step of collecting data matches to the caller request comprises the step of querying a database for matches to the request.

9. A method as recited in claim 8 wherein said database comprises a plurality of databases.

10. A method as recited in claim 8 wherein said database is queried via an Internet link.

11. A method as recited in claim 8 wherein said step of collecting data matches further comprises the step of the database returning a match to said query via an Internet link.

12. A method as recited in claim 8 wherein said step of collecting data matches comprises the step of receiving match data including the identity of a match, a toll-free telephone number representing the match, and business information describing the match.

13. A method as recited in claim 11 wherein said match is returned in the form of audio clip data.

14. A method as recited in claim 11 wherein said match is returned in the form of binary data and said data is processed to form said voice synthesized announcement.

15. A method as recited in claim 1 wherein said step of receiving a caller selection comprises the step of receiving a predetermined caller announcement.

16. A method as recited in claim 1 wherein said announcement comprises a voice synthesized announcement.

\* \* \* \* \*